Patented Sept. 22, 1936

2,055,083

UNITED STATES PATENT OFFICE 2,055,083

PHARMACEUTICAL PREPARATION

Gustav Klein, Mannheim, and Arno Grosse, Ludwigshafen-on-the-Rhine, Germany, assignors to Winthrop Chemical Company, Inc., New York, N. Y., a corporation of New York No Drawing. Application July 11, 1933, Serial No. 679,936. In Germany July 13, 1932

6 Claims. (Cl. 167—82)

The present invention relates to pharmaceutical preparations.

Pharmaceutically active substances when applied in the usual definite doses, which are neither below the limit of efficacy nor so large as to be noxious or even deleterious, never give the optimum effect because they are decomposed or rendered inert by fixation by the organism. An attendant drawback is that the doses have to be tendered in comparatively frequent intervals, and that it was scarcely possible to determine the right moment for the renewal of the application.

We have now found that pharmaceutical preparations for injection into the muscular system or subcutaneously can be prepared by incorporating a pharmaceutically active substance with an aqueous emulsion of a lipin and a substance exerting a stabilizing effect on said emulsion, whereby a system, hereinafter called "depot", is formed capable of holding any desired doses of the pharmaceutically active substance or medicament but releasing it over any desired space of time only gradually, so that large doses may be administered without the slightest detriment to the organism.

The said lipins comprise fatty, non-drying oils for example olive oil, almond oil, cod liver oil, cotton seed oil, soya bean oil, sesame oil, arachis oil, train oil, sunflower oil, coconut oil, and like non-drying oils of vegetable, i. e. animal and vegetable, origin. Similarly, synthetic equivalents of said oils, i. e. glycerol esters of long chain fatty acids, may be employed for the said purpose. All these substances will hereinafter be called "lipins". Lipins suitable for the manufacture of the depots also comprise phosphatides, obtainable for example from yolk or brain. As a particularly useful lipin from the phosphatide class, lecithin may be used, which acts simultaneously as a stabilizer and as an oily substance so that there is no need to add either another oil or a stabilizer; the same is true with cephaline. Purified wool fat and several of its constituents, such as eucerin or eurecol, also answers this purpose.

The said substances exerting a stabilizing effect on the emulsions will hereinafter and in the claims be called "stabilizer". These stabilizers comprise alkali salts of long-chain, saturated and unsaturated, fatty and resinic acids, containing at least 10 carbon atoms, and which may be hydroxylated. The alkali constituent of said stabilizers may be chosen for example from ammonia, from an alkali metal, such as sodium, potassium, lithium or strontium, or from an amine such as mono-, di- or tri-methyl, ethyl, n- or iso-butyl amine, mono-, di- or tri-ethanol amine, di-methyl mono ethanol amine, mono-ethyl-diethanol amine, choline, ethlene diamine or from any other desired amine. The acid component of said stabilizers may be chosen from palmitic, stearic, oleic, linoleic, linolic, ricinoleic, margaric, lauric, myristic, arachidic, behenic, melissic or like fatty acids, or from resinic acids such as abietic, pimelic or primaric acids, or by saponifying any desired resin of natural origin, such as colophonium, shellac, amber, copal, dammar and the like. An important characteristic of these stabilizers is their hydrophilic and lipophilic character which, as illustrated by the examples, makes it possible to apply these substances in small amounts relative to the amounts of other ingredients in the preparations of the present invention.

The said stabilizers act in two ways: they ensure the stability of the depot, and, according to kind and quantity, show the surprising effect of regulating the release of the medicament. For instance, compared with the same quantity of sodium oleate, sodium stearate accelerates, sodium linoleate retards the release of tribromethyl alcohol from a "depot" thereof. Again, in the case of a morphine depot, the accelerating action of sodium oleate increases as its quantity in the depot is increased.

The regulating properties of the stabilizers can be modified by the addition of "regulators", i. e. substances, which accelerate or moderate the velocity of the release. Such regulators may be divided into two groups: (1) accelerators which comprise for instance aromatic acids, such as benzoic, o-, m- and p-nitro-benzoic, o-, m- and p-aminobenzoic, o-, m-, p-hydroxy-benzoic, toluene-carboxylic, cinnamic, salicic, phthalic, benzene sulphonic, p-toluene sulphonic, α- and β-hydroxy naphthoic, α- and β-naphthalene sulphonic and like acids or alkali metal (Na, K, Li, Sr) salts thereof, terpenes such as camphor, aliphatic, cycloaliphatic and aromatic mono-, di- or trihydric alcohols, such as ethyl, amyl, butyl alcohols, glycols such as mono-ethylene glycol, glycerol, cyclohexanol, benzyl or cinnamic alcohols, purine derivatives such as theophylline, guanine, xanthine or theobromine, bile acids and alkali metal salts thereof, such as sodium glycholate or taurocholate; (2) moderators, which moderate the velocity of the release, comprise for instance cholesterin, caffeic acid, tannin, gallotannic acid, caffetannic acid, chlorogenic acid, quinic acid and like substances such as diacetyltannin, and also inorganic and organic calcium salts, such as calcium nitrate, lactate or pyrocatechin-disulphonate.

To ensure that the depots remain germ-free, even when kept under non-sterile conditions, and to prevent undesirable changes, antiseptics are preferably added, which, of course, must be indifferent to the organism, as for instance 2-butoxy-2'. 6'-diamino-5.5'-azopyridine, Trypan Blue (Schultz, Farbstofftabellen, 1931, 7th Ed. No. 471), Trypaflavine (ibid No. 906), 7-iodo-8-hydroxyquinoline-5-sulphonic acid sodium salt, the product sold under the name "Nipasol" (p-hydroxybenzoic acid normal-propyl ester) and that sold under the name "Nipagin M" (p-hydroxybenzoic acid methyl ester).

In order to increase the consistency of the depots waxes, wax-like substances or solid fats may be incorporated therewith, such as beeswax, carnauba wax, candelila wax, spermaceti, Japan wax, tallow, myricin and esters of cetyl, ceryl or myricyl alcohols with fatty acids containing at least 20 carbon atoms, such as behenic, lignoceric, cerotic or melissic acids. All these substances, which are solid at room temperature and have a melting point of at the most about 70° C., will hereinafter be called "stiffeners".

Depots of the kind here described are suitable for most efficiently, easily and safely administering all kinds of medicaments or pharmaceutically active substances, for example, anaesthetics such as morphine, cocaine, novocaine, the sodium salt of phenyl - dimethyl - pyrazolone-methyl-aminomethane sulphonic acid—further strophanthin, strychnine, and other alkaloids; particularly, however, hormones—adrenalin, insulin, sexual hormones, hyphophysis and pancreas extracts, growth-promoters, and the like.

The depots according to the present invention are usually prepared with the following proportions: for, say, 100 parts by weight of a lipin between about 100 and about 300 parts by weight of water, between about 3 and about 10 parts by weight of a stabilizer, between about 0.1 and about 5 parts by weight of a regulator, between about 0.01 and about 1 part by weight of an antiseptic, and between about 0.1 and about 20 parts by weight of a pharmaceutically active substance or medicament.

The dose of said pharmaceutically active substance or medicament which may be injected at one time in the form of a depot is about 20 times that of the normal dose.

The depots are specifically prepared for every medicament, and for every desired degree of efficacy, the general method of working being as follows with respect to the base of the depot.

2 parts by weight of myricine are triturated as finely as possible together with 25 parts by weight of olive oil in a mortar on a steam bath; when cooled to 60° C., 0.2 part by weight of the aforesaid product called "Nipasol" or the product sold under the name "Nipagin M" (p-hydroxybenzoic acid methyl ester) are added and homogeneously worked into the mixture; the whole is intimately stirred at room temperature with a solution of 1 part by weight of sodium oleate in 10 parts by weight of water. In a second mortar, 4 parts by weight of egg-lecithin are mixed with 10 parts by weight of water while adding one drop of a 20 per cent aqueous ammonia solution, the triturating being continued until the smell of ammonia has disappeared, 3 parts by weight of the medicament being then added and worked into the mass as finely as possible. The content of the second mortar is, in small portions, mixed with that of the first, the triturating being continued until a cream-like consistency results. The emulsion is kept in a closed vessel at room temperature for twenty-four hours, then triturated once more.

The quantities of the respective substances that go to make up the depot, and the sequence in which they are admixed, vary according to the nature of the medicament in question, especially according to its solubility in water or lipins, and the dose in which it is to be administered (compare Example 9). The quantity of water or of other liquid may vary within wide limits, but the preparations must be more or less fluid to allow injection. Instead of water, aqueous salt solutions, such as of potassium, sodium, magnesium or calcium chlorides, sulphates or phosphates, aqueous glycerine and the like, may be used. The depots are, as a rule, administered subcutaneously; in some cases injected into a muscle.

The depots according to this invention are distinguished from former preparations in the following respects:—

The regulative action of such emulsion on the velocity of the action of pharmaceutically active substance, which may be present in the depot in any, even in the lethal doses, the action of the emulsion being such as to constrain the release of the medicament over predetermined spaces of time, in small quantities of just the required efficacy, while the emulsion as such in no way affects the organism. Until the medicament administered has been entirely resorbed the emulsion is sure to remain stable; afterwards the emulsion is decomposed and its constituents are resorbed by the body without the slightest detriment thereto.

The following examples will further illustrate the nature of this invention but the invention is not restricted to these examples. The parts are by weight.

*Example 1*

An emulsion is prepared from

| | Parts |
|---|---|
| Olive oil | 21 |
| Water | 6 |
| Morphine hydrochloride | 10 |
| Sodium oleate | 0.5 |
| The product sold under the name "Nipasol" | 0.5 |

If such preparation, of which 1 cubic centimetre contains 300 milligrams of morphine, be administered subcutaneously to a patient afflicted with an uterus carcinoma (radiating pains) the patient remains free from pain for 10 days, while being fully conscious. The normal dose in that case of morphine injections is about 10 milligrams and is effective for from 6 to 10 hours only.

*Example 2*

An emulsion is prepared from

| | Parts |
|---|---|
| Olive oil | 25 |
| Water | 20 |
| Sodium oleate | 1.5 |
| Myricin | 1.5 |
| Cholesterin | 1.5 |
| Strophanthin | 0.020 |
| The product sold under the name "Nipasol" | 0.5 |

A quantity of this emulsion, containing 0.5 milligram of strophanthin was injected subcutaneously in guinea pigs. About 1½ hours after the injection, the well-known strophanthin cramp set in which lasted for 3 days, gradually diminishing until recovery.

A counter-test was made with an injection of an aqueous solution of 0.3 milligram; death occurred after ½ hour. Even from 0.15 to 0.20 milligram of strophanthin in aqueous solution when injected prove fatal within 24 hours. If in the aforesaid emulsion instead of 0.02 part of strophanthin, 2 parts of methylene blue are taken and 10 cubic centimetres are administered to a patient subcutaneously, excretion of methylene blue is observable for 12 days.

Example 3

A strophanthin depot of the following composition is prepared from

| | Parts |
|---|---|
| Olive oil | 25 |
| Water | 10 |
| Sodium linoleate | 1.5 |
| Myricin | 1.5 |
| Cholesterin | 1.5 |
| Strophanthin | 0.04 |
| The product sold under the name "Nipagin M" | 0.1 | of which a quantity containing 0.45 milligram of strophanthin (treble lethal dose), is injected subcutaneously in guinea pigs. After 1½ hours a just noticeable attack of strophanthin cramp set in which, however, lasts 5 days, whereupon the normal state returns.

Example 4

An emulsion prepared from

| | Parts |
|---|---|
| Lecithin | 25 |
| Water | 20 |
| Cholesterin | 1.5 |
| Strophanthin | 0.03 |
| The product sold under the name "Nipasol" | 0.5 | in a quantity containing 0.3 milligram of strophanthin is injected subcutaneously in a guinea pig; a noticeable strophanthin action sets in only from 12 to 24 hours after injection and continues for 7 days, when the normal state returns. The setting in of the visible effect of the depot is much delayed, the duration of the effect prolonged.

Example 5

An emulsion prepared from

| | Parts |
|---|---|
| Olive oil | 25 |
| Water | 20 |
| Sodium oleate | 1.5 |
| Cholesterin | 1.5 |
| Myricin | 1.5 |
| Tribromethyl alcohol | 5.7 |
| The product sold under the name "Nipagin M" | 0.1 |

This preparation subcutaneously injected in rabbits in a dose of 1.2 grams per kilogram of their weight, produces a deep narcosis lasting for from 2 to 3 hours, after which the animals awake unharmed.

In the form of a usual aqueous or olive oil solution the lethal dose for men subcutaneously administered, is 0.5 gram per kilogram; in the depot, a dose of 1 gram per kilogram induces sleep for several days without adverse subsequent effects.

Example 6

A depot is prepared from

| | Parts |
|---|---|
| Olive oil | 10 |
| Water | 3 |
| Sodium oleate | 0.5 |
| Cholesterin | 0.5 |
| Ethyl alcohol (or of octyl or amyl alcohols) | 6 |
| Tribromethylalcohol | 20 |
| The product sold under the name "Nipagin M" (the alcohol accelerates the release) | 0.1 |

Guinea pigs were given 0.61 cubic centimetre of this preparation subcutaneously, containing 0.55 gram of tribromethyl alcohol (1.2 grams per kilogram, which is double the lethal dose). Death occurred after 1½ hours, whereas, without an alcohol, the animals become normal again after the narcosis.

Example 7

A depot is prepared from

| | Parts |
|---|---|
| Olive oil | 25 |
| Water | 10 |
| Sodium ricinoleate | 1.5 |
| Cholesterin | 1.5 |
| Myricin | 1.5 |
| The product sold under the name "Nipasol" | 0.1 |
| Units of insulin | 1200 |

This preparation was subcutaneously injected in rabbits (2 kilograms in a dose containing 30 units of insulin). A reduction of the sugar in the blood by 50 per cent was observed, lasting for 3 days. The normal dose per kilogram weight is from ½ to 1 unit, but in this case, the content of sugar is normal again after 5 hours.

Example 8

A depot is prepared from

| | Parts |
|---|---|
| Lecithin | 30 |
| Water | 12 |
| Trypaflavin (Schultz, Farbstofftabellen 1931, 7th Ed., No. 906) (or the product sold under the name "Nipasol", the product sold under the name "Nipagin M", or 2-ethoxy-6.9-diamino acridine lactate) | 0.1 |

(The lecithin here acts as a lipin as well as a stabilizer.)

The emulsion is allowed to stand uncovered for 2 weeks at room temperature. The subsequent test as to infection showed aerobically as well as anaerobically negative results. The medicament may be added to emulsion-combination just prior to administration.

Example 9

A depot is prepared by making in a mortar an emulsion from

| | Parts |
|---|---|
| Myricin | 20 |
| Olive oil | 25 |
| Novocain | 1.0 |
| The product sold under the name "Nipasol", or the product sold under the name "Nipagin M" | 0.2 |
| Sodium oleate in | 1.5 |
| Water | 9 | and in a second mortar

| | Parts |
|---|---|
| Egg-lecithin | 1.5 |
| Water | 9.0 |
| Lysocithin | 1.0 | the content of both mortars being then carefully worked into a homogeneous mixture. (0.1 cubic centimetre of the emulsion corresponds to 2 milligrams of lysocithin.) Lysocithin results from the action of ferments of the poisonous secretions of snakes and bees upon lecithin and may be obtained as follows:—

To 40 egg yolks are added 4 bee stings together with 0.01 per cent by weight of a zinc or cadmium salt, such as the chlorides, sulphates or nitrates, as a catalyst, and after keeping the whole for 24 hours at a temperature of 40° C., ethyl alcohol is added to the mass and the whole is filtered; the filtrate is freed from alcohol, and cadmium chloride is added for precipitating the lysocithin-cadmium double salts and these are split by means of an ethyl alcoholic solution of ammonia, the whole being filtered and the filtrate evaporated; the residue is taken up in chloroform and ethyl ether added. Thus about 10 grams of crystalline lysocithin are precipitated. 1 milligram of this substance is equal in its action upon man to about one sting of a bee.

The depot is subcutaneously administered in cases of rheumatism, lumbago, and the like.

Example 10

A depot is prepared from

|   | Parts |
|---|---|
| Pure, crystallized lecithin from egg yoke | 120 |
| Olive oil | 31.5 |
| Water | 232 |
| 3 per cent aqueous solution of strychnine nitrate | 14 |
| Nipagin M | 0.5 |

The normal dose for subcutaneous injection of this depot is 1 cubic centimetre; it may find use in the so-called substitution-therapeutics.

Example 11

A depot is prepared from

|   | Parts |
|---|---|
| Olive oil | 126 |
| Water | 210 |
| Myricin | 3 |
| Cholesterin | 1 |
| Monopotassium phosphate | 1 |
| Nipagin M | 0.5 |
| Tannin | 0.15 |
| Calcium lactate | 0.5 |
| Insulin powder (1 milligram=17.4 insulin units) | 1.1 |

The injection of 1 cubic centimetre of this depot (=318 insulin units) lasts for 7 days; this means that instead of making one injection daily as hitherto usual, it is sufficient to make a single injection which lasts for 1 week.

Example 12

An emulsion is prepared from

|   | Parts |
|---|---|
| Lecithin | 2.5 |
| Water | 22.5 |
| Nipagin M | 0.2 |
| Carnauba wax | 1.5 |
| Olive oil | 13.5 |

The emulsion is incorporated with the residue obtainable by evaporating to dryness about 10 parts of a benzenic solution of female sexual hormone. 1 cubic centimetre (5000 units of hormone) of the resulting depot is the dose which as shown by the number of cases thus far treated, may be applicable for rendering normal the coagulation of the blood of people affected with hemophilia.

Example 13

A depot is prepared from

|   | Parts |
|---|---|
| Lecithin | 1 |
| Cetyl alcohol ceric acid esters | 8 |
| Nipagin M | 0.5 |
| Sodium sulphite | 0.5 |
| Olive oil | 27 |
| Water | 17 |
| Adrenalin bitartrate | 0.35 |

If 1 cubic centimetre of this depot be administered subcutaneously to a rabbit the increased blood pressure is maintained during 20 hours, whereas the effect of the hitherto normal injection only lasts for ½ hour.

The term "depot" in the appended claims denotes a system capable of holding a large dose of any desired size of the pharmaceutically active substance or medium, and of releasing the dose over any desired space of time only gradually, thus making it possible to administer to the organism at one time, a substantially large dose equivalent to many times the size of dose ordinarily administered.

We claim:

1. As a depot, a composition of matter comprising a pharmaceutically active substance suitable for injection, incorporated with an aqueous emulsion of a lipin, of a regulator adapted to accelerate or moderate the velocity of release of the active substance from the depot and up to about ten per cent with respect to the lipin of a hydrophilic and lipophilic stabilizer capable of insuring the stability of the emulsion.

2. A composition of matter in accordance with claim 1 into which an antiseptic has been incorporated which keeps the depot germ-free, even under non-sterile conditions.

3. As a depot, a composition of matter comprising as pharmaceutically active substance suitable for injection, incorporated with an aqueous emulsion of a lipin, and up to about ten per cent with respect to the lipin of a hydrophilic and lipophilic stabilizer capable of insuring the stability of the emulsion as well as of regulating the release of the medicament and an antiseptic which keeps the depot germ-free even under non-sterile conditions.

4. As a depot, a composition of matter comprising a pharmaceutically active substance suitable for injection, incorporated with an aqueous emulsion of a lipin, of a regulator adapted to accelerate or moderate the velocity of release of the active substance from the depot, up to about ten per cent with respect to the lipin of a hydrophilic and lipophilic stabilizer capable of insuring the stability of the emulsion, and a stiffener to increase the consistency of the depot.

5. As a depot, a composition of matter comprising a pharmaceutically active substance, incorporated with an aqueous emulsion of lecithin, which lecithin acts both as a lipin and as a stabilizer capable of both insuring the stability of the depot as well as of regulating the release of the active substance.

6. As a depot, a composition of matter comprising a pharmaceutically active substance incorporated with an aqueous emulsion of a lipin composed of about 1 part by weight of a lipin and between about 0.3 and about 3 parts by weight of water; and up to about ten per cent, relative to the amount of the lipin, of a hydrophilic and lipophilic stabilizer capable of insuring the stability of the depot as well as of regulating the release of the medicament.

GUSTAV KLEIN.
ARNO GROSSE.